July 19, 1960
G. BURRELL
2,945,715
FLUID SEAL
Filed April 18, 1957
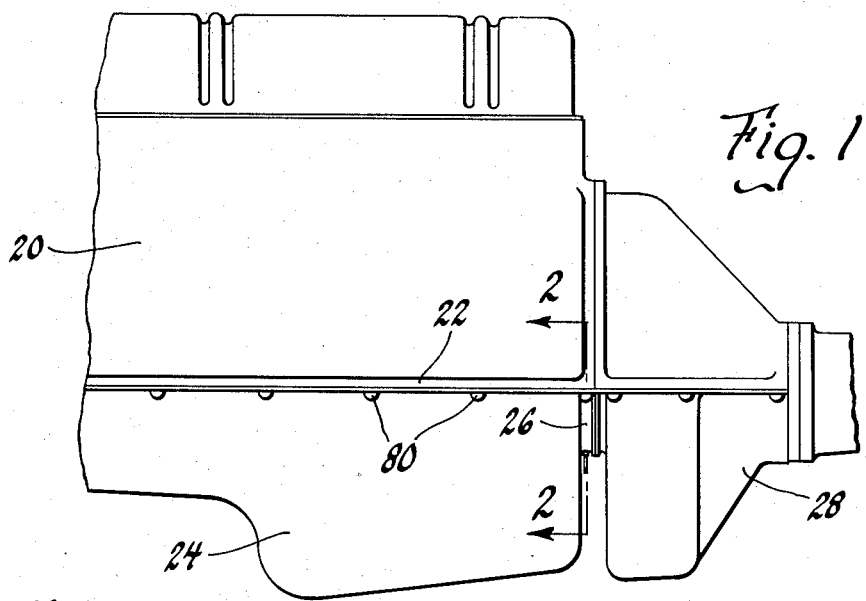
Fig. 1
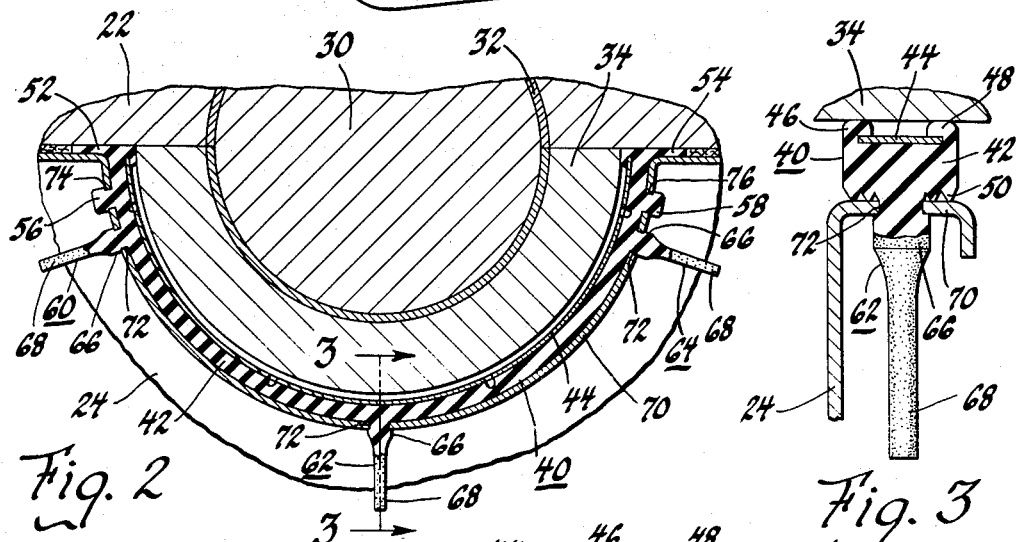
Fig. 2
Fig. 3
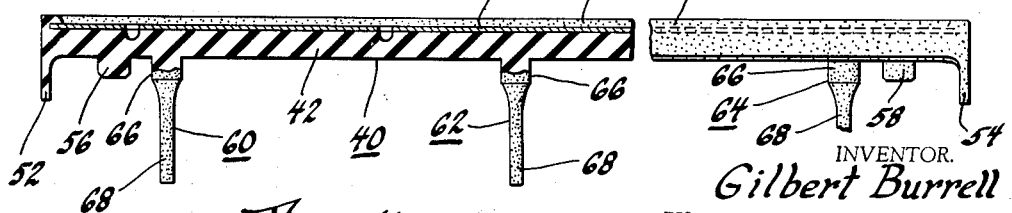
Fig. 4
INVENTOR.
Gilbert Burrell
BY 
HIS ATTORNEY

United States Patent Office 2,945,715
Patented July 19, 1960

2,945,715
FLUID SEAL

Gilbert Burrell, Lansing, Mich., assignor to General Motors Corporation, Detroit, Mich., a corporation of Delaware Filed Apr. 18, 1957, Ser. No. 653,660

9 Claims. (Cl. 288—23)

This invention relates to fluid seals and is particularly concerned with fluid seals used for sealing the crank case of an internal combustion engine and the like.

One of the objects of the invention is to provide a fluid seal of the class described which includes an elastomeric elongated body portion including a reinforcing element therein which body portion is provided with a plurality of attachment lugs extending from one surface thereof having depending cylindrical portions thereon of progressively smaller diameter whereby the seal may be attached to the surface to be sealed through said attachment lugs and firmly held thereto.

Another object of the invention is to provide a fluid seal for sealing two mating surfaces wherein one of the surfaces includes a plurality of spaced locating apertures therethrough, the seal comprising an elongated elastomeric body having opposed sealing surfaces and also including a longitudinally extending metal reinforcing member embedded therein, one of said sealing surfaces being provided with compressible longitudinally extending lips or ridges and the other of said sealing surfaces being provided with a plurality of spaced attachment lugs adapted to pass through the spaced apertures in one of the surfaces to be sealed, said lugs each comprising two cylindrical portions, one of which is of smaller diameter than the apertures and the other of which is larger than the diameter of the apertures whereby the smaller diameter portion of each lug may be passed through an aperture and pulled manually from the opposite side to reduce the diameter of the larger diameter portion to cause said portion to pass through the aperture; upon release of the lug, the larger diameter portion will expand and firmly hold the seal to the surface while the metal reinforcing member prevents transverse displacement of the seal.

Further objects and advantages of the present invention will be apparent from the following description, reference being had to the accompanying drawings wherein preferred forms of the present invention are clearly shown.

In the drawings:

Figure 1 is a fragmentary diagrammatic view of an internal combustion engine showing one application of the present seal.

Figure 2 is a view in section taken on line 2—2 of Figure 1.

Figure 3 is a view in section taken on line 3—3 of Figure 2.

Figure 4 is a partial sectional view of a seal as described herein in its free state.

The sealing of the crank case of an internal combustion engine against outflow and leakage of oil presents a difficult problem adjacent the front and rear ends thereof where the crank case pan must necessarily be depressed to pass the crank shaft and its bearings. In general, this sealing operation has been carried out by means of a cork gasket that is laid in place and is carefully fitted to the surfaces to be sealed whereupon the crank case is positioned with respect to the engine block and bolted thereto. In such an application, the gasket frequently slips during the assembly operation and forms an imperfect seal and, in other extreme instances, blows out of place due to internal pressure within the crank case, upon backfire of the engine, for example. In any event, such gasketing procedures have never been entirely satisfactory to form a dependable seal which would function properly during normal and extreme service. Furthermore, the crank case pan, being formed from stamped materials, had to be accurately dimensioned so that the clearance between the portions to be sealed was within predetermined limits which would assure compression of the thin cork gasketing material. This condition required special care in the manufacture of the pans and inspection thereof and increased the cost while, in many instances, due to the inherent failings of the gasket material, did not provide for dependable sealing.

The present invention is directed to a seal for use between the crank case pan and the block of an internal combustion engine, for example, at the front and/or rear ends thereof which may be accurately manufactured and is reinforced against displacement and is immovably positioned with respect to the pan and wherein the seal will take up for considerable clearance between the pan and the block.

Referring specifically to the drawings, in Figure 1, a portion of an internal combustion engine is shown at 20 wherein the block is noted at 22 and the crank case pan at 24. The rear end of the pan 24 is sealed to the block at a semi-circular portion 26 positioned at the rear end of the block wherein the crank shaft passes through this portion and into the transmission 28. A section of this portion of the assembly is shown in Figure 2 wherein the crank shaft is shown at 30. The rear main bearing is depicted at 32 and acts as a journal for the shaft 30. The bearing 32 is supported and held to the block by a bearing cap 34.

A seal of the class described is shown in the installed position in Figure 2 and is designated by the numeral 40. The same seal 40 is shown in Figure 4 in the free state. In this instance, the seal 40 is provided with a main body portion 42 of elastomeric material which will resist deterioration when subjected to oil. Such materials as neoprene (polychloroprene), Buna N rubber (butadiene acrylonitrile copolymer), Thiokol (polysulfide rubber) are in this general classification or other materials such as a synthetic rubber or plastic which is elastomeric in nature and which will resist attack by oil may be used. The body portion 42 is of generally rectangular cross section as shown in Figure 3 and includes adjacent one face thereof an embedded and elongated metallic reinforcing member 44 which is preferably bonded to the body portion 42 during the curing of the rubber-like material. In one form, the reinforcement 44 may be exposed at its central longitudinal portion while the body portion 42 includes two longitudinally extending seal lips or ribs 46 and 48 as longitudinal borders for the member 44. It is apparent that the reinforcing member 44 may be completely embedded, if desired, although for ease of manufacture, the present design is preferred. The opposite side of the seal body 42 is provided with a plurality of longitudinally extending ribs or ridges 50, the purpose of which will be described hereinafter. Opposite ends of the seal body 42 include depending integral end portions 52 and 54 which extend transversely from the body portion. Intermediate the end portions 52 and 54 are a pair of outwardly extending integral locating lugs 56 and 58 and a plurality of attachment lugs designated at 60, 62 and 64. Each of the attachment lugs includes a depending cylindrical portion 66 and an elongated cylindrical extension of smaller diameter 68 thereon.

The crank case pan 24 includes an outwardly extending flange 70 of semi-circular shape at the point that the seal is to be applied. This flange 70 includes a plurality of apertures 72 therethrough and spaced uniformly therearound. The apertures 72 have a diameter slightly less than the diameter of the cylindrical portion 66 of the attachment lugs 60, 62 and 64. However, the diameter of the apertures 72 are larger than the diameter of the extension 68 of the attachment lugs 60, 62 and 64. At the opposite ends of the flange 70 are provided apertures 74 and 76 which are adapted to receive the locating lugs 56 and 58 without substantial compression thereof.

When the seal is to be assembled to the pan, the depending seal portions 52 and 54 are placed adjacent the ends of the flange 70 and the lugs 56 and 58 are placed through apertures 74 and 76, respectively, while the extensions 68 are passed through the apertures 72. In this position, the cylindrical portion 66 will not pass the apertures and it is necessary to manually grasp each extension 68 and pull the same outwardly to cause the attachment lugs 60, 62 or 64 as the case may be, to elongate whereby the diameter of the cylindrical portions 66 decreases sufficiently to pass through the apertures 72. Upon release of the extension 68 the elastomeric material regains its former shape and size causing the cylindrical portions 66 to be held tightly in the apertures 72. In this manner, any number of attachment lugs may be used as necessary and when the seal is in place, it will be firmly held to the crank case flange 70 in predetermined position. The pan may then be easily bolted to the block without fear of the seal being dislodged or moved from its desired position and, as the pan is drawn tight to the block through manipulation of bolts 80, the seal is compressed and forms a fluid tight engagement between the surfaces to be sealed. During this compression step, the seal lips 46 and 48 mushroom out and the longitudinally extending ribs 50 likewise are deformed to produce good sealing surfaces wherein the dimensional tolerances of the several parts being sealed are not of major importance since there is considerable take-up in these compressible portions of the seal. When the pan has been drawn tight to the block, the end portions 52 and 54 seal therebetween and the remainder of the seal is firmly held in position.

The use of the reinforcing element 44 is a major improvement in the design of this seal since it strengthens the seal and prevents transverse dislodgement thereof upon backfire or upon compression of the seal when oil is present at the surfaces to be sealed. In other words, the reinforcing element maintains the seal in alignment with the parts to be sealed at all times and prevents any possible failure of the seal in service.

It is understood that the positioning lugs 74 and 76 may be eliminated as desired although where a large area is to be sealed, they are useful in positioning the seal during its assembly. It is also apparent that the number of attachment lugs may be increased as desired and that the use of the depending transversely extending end portions may be modified or eliminated, the main features of the seal being the longitudinally extending compressible seal surfaces at opposite sides thereof which permit wide dimensional tolerances to be accommodated by the seal, the use of the reinforcing member to prevent transverse displacement thereof during application or use of the seal and the attachment lugs which resiliently hold the seal firmly in place and which are easily manipulated during the installation process.

The metal reinforcement is preferably sand blasted, brass plated or otherwise conventionally treated to properly prepare the metal insert for bonding if such procedure is desired.

From the foregoing, it is manifest that the present seal has eliminated many problems heretofore present in sealing of internal combustion engine crank cases adjacent semi-circular portions thereof which heretofore have created major problems and have required rather close dimensional tolerances and great care in the assembly of parts in order to effect a satisfactory seal.

While the embodiments of the present invention as herein disclosed constitute preferred forms, it is to be understood that other forms might be adopted.

What is claimed is as follows:

1. A fluid seal adapted to seal between two mating surfaces wherein one of the surfaces includes a plurality of spaced apertures therethrough, comprising; an elongated main body portion formed from elastomeric material, an elongated metallic reinforcement at least partially embedded in said body portion, a raised seal surface extending outwardly and longitudinally of one side of the body portion and a plurality of spaced outwardly extending lugs integrally formed with said body portion from the side opposite to the side carrying the seal surface, each including depending cylindrical portions thereon of progressively smaller diameter, said lugs being adapted to be pulled through said apertures and one of said mating surfaces for holding the seal in predetermined position relative to said surface.

2. A fluid seal adapted to seal between two mating surfaces wherein one of the surfaces includes a plurality of spaced apertures therethrough, comprising; an elongated main body portion of generally rectangular cross section and formed from elastomeric material, an elongated metal reinforcement at least partially embedded in said body portion adjacent one side thereof, a seal surface extending outwardly and longitudinally from said one side of the body portion and a plurality of spaced outwardly extending lugs integrally formed on said body portion and extending from the side opposite to the side adjacent said reinforcement, said lugs each including depending cylindrical portions of progressively smaller diameter, said lugs being adapted to be pulled through said apertures and one of said mating surfaces for holding the seal in predetermined position relative to said surface.

3. A fluid seal adapted to seal between two mating surfaces wherein one of the surfaces includes a plurality of spaced apertures therethrough, comprising; an elongated main body portion of generally rectangular cross section and formed from elastomeric material, a metal reinforcement embedded adjacent one surface of said body portion, a pair of opposed longitudinally extending raised seal surfaces extending outwardly from the body portion in parallel relation and adjacent said reinforcement, and a plurality of spaced outwardly extending lugs integrally formed with the body portion, each of said lugs including a cylindrical portion having a reduced diameter extension thereon, said lugs being adapted to be pulled through said apertures and one of said mating surfaces for holding the seal in predetermined position relative to said surface.

4. A fluid seal adapted to seal between two mating surfaces wherein one of the surfaces includes a plurality of spaced apertures therethrough, comprising: an elongated main body portion of generally rectanglar cross section and formed from elastomeric material, a metal reinforcement embedded adjacent one side of said body portion, a plurality of longitudinally extending raised ribs formed in said body portion at the side opposite the side carrying the longitudinally extending reinforcement, and a plurality of lugs formed integral with the body portion and extending from the side carrying the ribs, each of said lugs including a depending cylindrical portion having a reduced diameter extension thereon, said lugs being adapted to be pulled through said apertures and one of said mating surfaces for holding the seal in predetermined position relative to said surface.

5. A fluid seal adapted to seal between two mating surfaces wherein one of the surfaces includes a plurality of spaced apertures therethrough, comprising; an elongated main body portion formed from elastomeric material, a metal reinforcing element embedded in said body portion, two depending integral end portions extending transversely from said body portion at one side thereof, and a plurality of spaced integral attachment lugs positioned between said end portions and extending outwardly in the same direction as said end portions, each of said attachment lugs comprising a cylindrical body portion having a reduced diameter extension thereon, said lugs being adapted to be pulled through said apertures and one of said mating surfaces for holding the seal in predetermined position relative to said surface.

6. A fluid seal adapted to seal between two mating surfaces wherein one of the surfaces includes a plurality of spaced apertures therethrough, comprising; a generally rectangular elongated body portion formed from elastomeric material, an elongated metal reinforcement member embedded in said body portion adjacent one surface thereof, a pair of compressible longitudinally extending parallel seal surfaces extending outwardly along one side of said body portion and a plurality of spaced outwardly extending integral attachment lugs extending from said body portion in opposed relation to said seal surfaces, each of said lugs including a depending cylindrical portion having a reduced diameter extension thereon, said lugs being adapted to be pulled through said apertures and one of said mating surfaces for holding the seal in predetermined position relative to said surface.

7. A fluid seal adapted to seal between two mating surfaces wherein one of the surfaces includes a plurality of spaced apertures therethrough, comprising; a generally rectangular elongated body portion formed from elastomeric material, an elongated metal reinforcement member embedded in said body portion adjacent one surface thereof, a pair of compressible longitudinally extending parallel seal surfaces extending outwardly along one side of said body portion, two positioning lugs positioned adjacent opposite ends of said seal extending outwardly of the seal on the side opposite from the side carrying the longitudinally extending seal surfaces, and a plurality of spaced depending integral attachment lugs positioned intermediate said positioning lugs, each of said attachment lugs including a cylindrical portion and a reduced diameter portion extending from said cylindrical portion, said lugs being adapted to be pulled through said apertures and one of said mating surfaces for holding the seal in predetermined position relative to said surface.

8. A fluid seal adapted to seal between two mating surfaces wherein one of said surfaces includes a plurality of spaced apertures therethrough, the combination comprising; an elongated elastomeric body member including two opposed sealing surfaces thereon and having a length at least equal to the longitudinal dimension of the surfaces to be sealed, a longitudinally extending metal reinforcing member embedded in said body member adjacent one of its sealing surfaces, one of said sealing surfaces also including a plurality of outwardly extending integral extensions adapted to be aligned with said apertures in one of said surfaces when the seal is applied thereto, said extensions including coaxial diameters thereon wherein the portions of each extension spaced from the main body member are of less diameter than the aperture and the portions of each extension adjacent the main body member are of greater diameter than the aperture whereby the lesser diameter portions of the extensions may be positioned through said apertures and pulled from the opposite side of the surface to be sealed for reducing the larger diameter portions thereof sufficiently to pass through the apertures so that release of the extensions allows the larger diameter portions thereof to expand and tightly hold the seal to the surface to be sealed whereby the seal is maintained in predetermined position between the surfaces when the surfaces are placed in mating position.

9. A fluid seal adapted to seal between two mating semi-cylindrical surfaces wherein one of said surfaces includes a plurality of spaced and aligned apertures therethrough, the combination comprising; an elongated elastomeric body member including two opposed sealing surfaces thereon and having a developed length at least equal to the longitudinal dimension of the surfaces to be sealed, a longitudinally extending metal reinforcing member embedded in said body member adjacent one of its sealing surfaces, a plurality of longitudinally extending grooves at the other of said sealing surfaces, the other of said sealing surfaces also including a plurality of outwardly extending integral extensions adapted to be aligned with said apertures in one of said surfaces when the seal is applied thereto, said extensions including coaxial diameters thereon wherein the portions of each extension spaced from the main body member are of less diameter than the apertures and the portions of each extension adjacent the main body member are of greater diameter than the apertures whereby the lesser diameter portions of the extensions may be positioned through said apertures and pulled from the opposite side of the surface to be sealed for reducing the larger diameter portions thereof sufficiently to pass through the apertures so that release of the extensions allows the larger diameter portions thereof to expand and tightly hold the grooved surface of the seal to the surface to be sealed whereby the seal is maintained in predetermined position between the surfaces when the surfaces are placed in mating position.

References Cited in the file of this patent

UNITED STATES PATENTS

| | | |
|---|---|---|
| 1,632,903 | Jorgensen | June 21, 1927 |
| 1,653,012 | Jorgensen | Dec. 20, 1927 |
| 1,978,019 | Hauschalter | Oct. 23, 1934 |
| 1,994,361 | Johnson | Mar. 12, 1935 |
| 2,025,960 | Sindler | Dec. 31, 1935 |
| 2,324,568 | Duggan | July 20, 1943 |
| 2,543,963 | Gaffin | Mar. 6, 1951 |